(12) United States Patent
Oh et al.

(10) Patent No.: US 9,625,624 B2
(45) Date of Patent: *Apr. 18, 2017

(54) COLOR IMPROVING FILM AND METHOD OF MANUFACTURING THE SAME

(71) Applicant: Samsung Electronics Co., Ltd., Suwon-Si, Gyeonggi-Do (KR)

(72) Inventors: Young Oh, Uiwang-si (KR); Hyun-min Kim, Uiwang-si (KR); Young-hyun Ju, Uiwang-si (KR); Seung-man Choi, Uiwang-si (KR); You-min Shin, Gumi-si (KR); Hong-shik Shim, Seoul (KR); Chul-ho Jeong, Hwaseong-si (KR); Eun-young Cho, Gumi-si (KR)

(73) Assignees: Samsung Electronics Co., Ltd., Gyeonggi-do (KR); Cheil Industries Inc., Gumi-si (KR)

( * ) Notice: Subject to any disclaimer, the term of this patent is extended or adjusted under 35 U.S.C. 154(b) by 141 days.

This patent is subject to a terminal disclaimer.

(21) Appl. No.: 14/291,955

(22) Filed: May 30, 2014

(65) Prior Publication Data

US 2014/0355123 A1 Dec. 4, 2014

(30) Foreign Application Priority Data

May 31, 2013 (KR) ........................ 10-2013-0063018

(51) Int. Cl.
*G02B 5/02* (2006.01)
*H01L 51/52* (2006.01)
(Continued)

(52) U.S. Cl.
CPC ...... *G02B 5/0242* (2013.01); *B29D 11/00278* (2013.01); *B29D 11/00788* (2013.01); *G02B 3/005* (2013.01); *G02B 3/0037* (2013.01)

(58) Field of Classification Search
None
See application file for complete search history.

(56) References Cited

U.S. PATENT DOCUMENTS

| 5,995,288 A | 11/1999 | Kashima et al. |
| 6,319,594 B1 | 11/2001 | Suzuki et al. |
| (Continued) | | |

FOREIGN PATENT DOCUMENTS

| JP | 2007264113 A | 10/2007 |
| JP | 2009-003451 A | 1/2009 |
| (Continued) | | |

OTHER PUBLICATIONS

European Search Report mailed on Jun. 26, 2014 to corresponding European Patent Application No. 14158035.7.

*Primary Examiner* — Khaja Ahmad
(74) *Attorney, Agent, or Firm* — Harness, Dickey & Pierce, P.L.C.

(57) ABSTRACT

Provided is a color improving film comprising a base layer, a high refractive light diffusion layer including an organic light diffuser on the base layer, a high refractive resin layer on the high refractive light diffusion layer, and a low refractive resin layer in which a lenticular lens pattern is formed on the high refractive resin layer, wherein the organic light diffuser comprises particles coated with a black pigment and non-coated particles, and wherein the lenticular lens pattern is formed on a surface of the low refractive resin layer facing the high refractive resin layer. According to the color improving film, a change in color sensitivity according to an angle of view is small, an external light reflectivity is low, and a light transmittivity and a light diffusibility are substantially improved. Also, the method of preparing the color improving film has excellent processiblity and economic efficiency.

17 Claims, 6 Drawing Sheets

(51) Int. Cl.
*G02B 3/00* (2006.01)
*B29D 11/00* (2006.01)

(56) References Cited

U.S. PATENT DOCUMENTS

| | | | |
|---|---|---|---|
| 2006/0209403 A1* | 9/2006 | Parusel | G02B 5/0221 |
| | | | 359/453 |
| 2007/0035839 A1 | 2/2007 | Ibuki | |
| 2007/0146887 A1 | 6/2007 | Ikeda et al. | |
| 2009/0066219 A1 | 3/2009 | Handa et al. | |
| 2009/0128738 A1* | 5/2009 | Matsumoto | G02B 5/0231 |
| | | | 349/64 |
| 2009/0284686 A1 | 11/2009 | Joo et al. | |
| 2010/0097705 A1* | 4/2010 | Furui | B29D 11/0073 |
| | | | 359/599 |
| 2011/0256312 A1 | 10/2011 | Suzuki et al. | |
| 2012/0176572 A1 | 7/2012 | Park et al. | |
| 2012/0307191 A1 | 12/2012 | Park et al. | |

FOREIGN PATENT DOCUMENTS

| | | |
|---|---|---|
| JP | 2009-036910 A | 2/2009 |
| KR | 10-0599975 B1 | 7/2006 |
| KR | 20080055699 A | 6/2008 |
| KR | 20080086210 A | 9/2008 |
| KR | 20110065610 A | 6/2011 |
| KR | 20120063730 A | 6/2012 |
| KR | 10-1200770 B1 | 11/2012 |

\* cited by examiner

COLOR IMPROVING FILM AND METHOD OF MANUFACTURING THE SAME

RELATED APPLICATIONS

This application claims priority from Korean Patent Application No. 10-2013-0063018, filed on May 31, 2013, in the Korean Intellectual Property Office, the disclosure of which is incorporated herein in its entirety by reference.

BACKGROUND

1. Field

Example embodiment relate to color improving films and methods of manufacturing the films, to color improving films in which a change in white angle dependency according to viewing angle is small and external light reflection is improved, and/or to a method of manufacturing the color improving films.

2. Description of the Related Art

A liquid crystal display (LCD) has a structure in which a panel including liquid crystals that are arranged to form a screen is disposed in a tempered glass and a backlight disposed behind the panel emits light to represent a color image. Though the LCD has a high image quality and incurs low manufacturing costs, LCD has process complexity, a low response speed, a narrow angle of view, and a high power consumption, which have been continuously pointed out as drawbacks. Thus, there is a continuous need for development of a new display.

An organic light-emitting display (OLED) is being noticed as a next-generation display that supplements drawbacks of an LCD. An organic light-emitting display represents colors by using a light emission phenomenon where light is emitted when a current flows through a fluorescent organic compound and R (red), G (green), and B (blue) color light are emitted according to organic materials. An organic light-emitting display device has a high resolution and a wide angle of view, may be driven at a low power consumption, and has a high response speed, no afterimage is generated, and natural images are realized. Thus, the organic light-emitting display device may be widely used not only in portable devices but also in general digital TVs. However, an organic light-emitting display device such as an OLED TV may have a change in color sensitivity according to an angle of view.

Thus, development of an optical film for organic light emitting display devices, which has excellent processibility and economic efficiency and a reduced change in color and a low external light reflectivity, may be advantageous.

SUMMARY

Example embodiments relate to color improving films with a small change in color sensitivity according to an angle of view.

Example embodiments relate to color improving films having an excellent light transmittivity and an excellent light diffusivity.

Example embodiments relate to color improving films with a small external light reflectivity.

Example embodiments relate to methods of preparing color improving films having an excellent processibility and an excellent economic efficiency.

Additional aspects will be set forth in part in the description which follows and, in part, will be apparent from the description, or may be learned by practice of the presented embodiments.

According to at least one example embodiment, a color improving film includes a base layer, a high refractive light diffusion layer including an organic light diffuser, a high refractive resin layer, and a low refractive resin layer in which a lenticular lens pattern is formed, wherein the base layer, the high refractive light diffusion layer, the high refractive resin layer, and the low refractive resin layer are sequentially stacked, wherein the organic light diffuser comprises particles coated with a black pigment and non-coated particles in a weight ratio of about 1:0.5 to about 1:5.0, and wherein the lenticular lens pattern is formed on a surface of the low refractive resin layer facing the high refractive resin layer.

The organic light diffuser may include at least one of acrylic particles, siloxane based particles, melamine based particles, polycarbonate based particles, and styrene based particles.

The organic light diffuser may include spherical particles having an average particle diameter (D50) of about 2 μm to about 20 μm, and the black pigment includes carbon black.

The organic light diffuser may be included in the high refractive index light diffusion layer in about 0.1 wt % to about 10 wt %.

The lenticular lens pattern may be formed of a plurality of lenticular lenses and the lenticular lens may have a width D of 1 μm to 1000 μm, a height H of 1 μm to 3000 μm, and an aspect ratio H/D of 1.0 to 3.0.

The lenticular lens pattern may include a plurality of lenticular lenses, wherein adjacent lenticular lenses are spaced apart by a distance L, wherein a ratio (L/D) between the distance L and a width D of a unit lenticular lens is 3.0 or less.

The high refractive light diffusion layer and the high refractive resin layer may include an ultraviolet hardening transparent resin having a refractive index of about 1.50 to about 1.60.

The low refractive resin layer may include an ultraviolet hardening transparent resin having a refractive index of about 1.35 to about 1.45.

The lenticular lens pattern and the low refractive resin layer may be formed as a single unit.

The high refractive light diffusion layer including the light diffuser and the high refractive resin layer may be formed as a single unit.

The high refractive resin layer and the low refractive resin layer may include ultraviolet hardening resins having an acrylic functional group.

A thickness of the base layer may be about 30 μm to about 200 μm, a thickness of the high refractive light diffusion layer may be about 5 μm to 60 μm, a maximum thickness of the high refractive resin layer may be about 5 μm to 80 μm, and a thickness of the low refractive resin layer may be about 5 μm to 50 μm.

The color improving film may further include an adhesive layer that is stacked on the other surface of the low refractive resin layer.

The base layer may include triacetate cellulose (TAC), polyethylene terephthalate (PET), polycarbonate (PC), or poly vinyl chloride (PVC).

According to another example embodiment, a method of manufacturing a color improving film, includes forming a high refractive light diffusion layer by spreading a resin including a light diffuser on a surface of a base layer and hardening the resin, forming a high refractive resin layer comprising an engraved lenticular lens pattern, on a surface of the high refractive diffusion layer, and forming a low refractive resin layer on a surface of the high refractive resin layer, in which a lenticular lens pattern is engraved, with a low refractive transparent resin, and hardening the low refractive transparent resin so that the low refractive resin layer has an optical pattern on a surface of the low refractive resin layer.

The method may further include forming an adhesive layer by covering the other surface of the low refractive resin layer with an adhesive.

According to another example embodiment, an organic light-emitting display device includes the color improving film described above.

According to the color improving film of example embodiments, a change in color sensitivity according to an angle of view is small, and external light reflectivity thereof is low. Also, the color improving film has excellent light transmittivity and light diffusability, and a manufacturing method thereof has an improved processibility and economical efficiency.

BRIEF DESCRIPTION OF THE DRAWINGS

These and/or other example embodiments will become apparent and more readily appreciated from the following description, taken in conjunction with the accompanying drawings in which.

DETAILED DESCRIPTION

Figure 1:
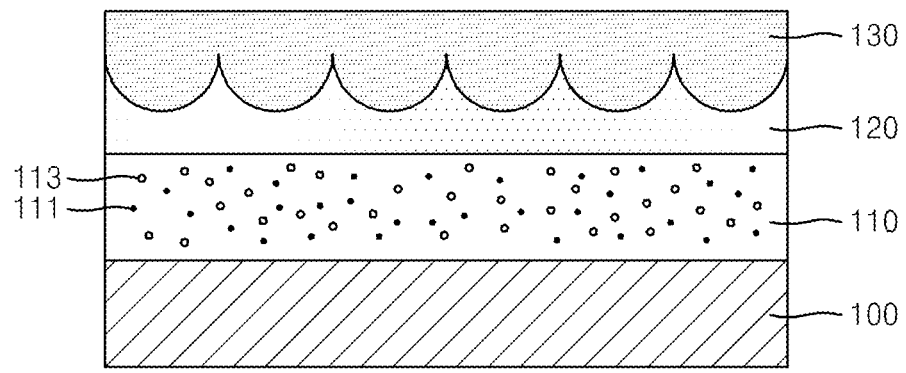
FIG. 1 is a cross-sectional view illustrating a color improving film according to an example embodiment.

Reference will now be made in detail to example embodiments illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures.

The thicknesses or lines or sizes of components illustrated in the drawings may be exaggerated for clarity and convenience of description.

Also, the terms described below are defined in consideration of functions in the example embodiments and may vary according to the intention of a user or an operator or according to custom.

Thus, the terms should be defined based on the overall description of the example embodiments.

It will be understood that when an element is referred to as being "on," "connected" or "coupled" to another element, it can be directly on, connected or coupled to the other element or intervening elements may be present. In contrast, when an element is referred to as being "directly on," "directly connected" or "directly coupled" to another element, there are no intervening elements present. As used herein the term "and/or" includes any and all combinations of one or more of the associated listed items. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

In the drawing figures, the dimensions of layers and regions may be exaggerated for clarity of illustration. Like reference numerals refer to like elements throughout. The same reference numbers indicate the same components throughout the specification.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. As used herein, expressions such as "at least one of," when preceding a list of elements, modify the entire list of elements and do not modify the individual elements of the list.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain example embodiments of the present description.

Color Improving Film

FIG. 1 is a cross-sectional view illustrating a color improving film according to an example embodiment. Referring to FIG. 1, the color improving film has a structure in which a base layer 100, a high refractive light diffusion layer 110 including light diffusers 111 and 113, a high refractive resin layer 120, and a low refractive resin layer 130 including a lenticular lens pattern are sequentially stacked, and the lenticular lens pattern is formed on a surface of the low refractive resin layer 130 facing the high refractive resin layer 120.

The base layer 100 may be formed of a transparent resin film or a glass substrate that has a light incident surface and a light exit surface facing the light incident surface and that has ultraviolet transmittivity. The base layer 100 may be formed of a material such as, e.g., triacetate cellulose (TAC), a polyethylene terephthalate (PET), polycarbonate (PC), or a polyvinyl chloride (PVC), and may be a single layer or a multi-layer.

The base layer 100 may have a thickness of about 30 μm to about 200 μm.

The high refractive light diffusion layer 110 may be stacked on the light incident surface of the base layer 100 and may be formed of a light diffuser and an ultraviolet hardening transparent resin having a refractive index of about 1.50 to about 1.60. The high refractive light diffusion layer 110 may have a thickness of about 5 μm to about 60 μm.

The light diffuser 111 included in the high refractive light diffusion layer 110 may be an organic light diffuser. The organic light diffuser may be formed, e.g. solely formed, of acrylic particles, siloxane based particles, melamine based particles, polycarbonate based particles, styrene particles or a mixture of these. For example, the organic light diffuser may be formed of siloxane based particles. The organic light diffuser may be spherical particles having an average diameter D50 of about 2 μm to about 20 μm.

The organic light diffuser may comprise an organic light diffuser coated with a black pigment. However, when the organic light diffuser coated with a black pigment is used alone, light transmittivity may be decreased to cause a decrease in luminance and in white of a final resin composition. Accordingly, instead of using only the organic diffuser coated with a black pigment, the organic light diffuser may be used together with a non-coated organic light diffuser. The black pigment may be, for example, carbon black or iron black.

The organic light diffuser coated with a black pigment and the non-coated organic light diffuser may be used in a mixture at a weight ratio of about 1:0.5 to about 1:5.0. A reduction effect of a color change of the non-coated organic light diffuser according to luminance and an angle of view, and a reduction effect in a whitening phenomenon due to the organic light diffuser coated with a black pigment may be achieved simultaneously, and thus, a contrast ratio of a panel may be improved and external light reflectivity may be reduced.

In particular, if an optical pattern formed in the low refractive resin layer 130 is a lenticular lens pattern in a perpendicular direction of the panel, color improvement in a horizontal direction of the panel may be obtained, but color improvement in a vertical direction may not be obtained due to the shape of the lenticular lenses that are arranged perpendicularly. However, when the two types of organic light diffusers are applied as described above, color improvement may be obtained both in a horizontal direction and in a vertical direction.

The light diffusers 111 and 113 according to the example embodiment may be included in the high refractive light diffusion layer 110 in about 0.1 wt % to about 10 wt %.

The high refractive resin layer 120 may be disposed between the high refractive light diffusion layer 110 and the low refractive resin layer 130 in which an optical pattern that faces the high refractive light diffusion layer 110 is formed.

Light having relatively high color purity incident on a panel may be emitted in a direction perpendicular to the light exit surface, and to further widely spread the incident light having relatively high color purity, the optical pattern may be formed as a lenticular lens pattern.

The high refractive resin layer 120 may include an ultraviolet hardening transparent resin having a refractive index of about 1.50 to about 1.60. The high refractive resin layer 120 may not have a uniform layer thickness as the optical pattern formed in the low refractive resin layer 130 penetrates into the high refractive resin layer 120. A maximum thickness of the high refractive resin layer 120 may be about 5 µm to about 80 µm.

Figure 6:
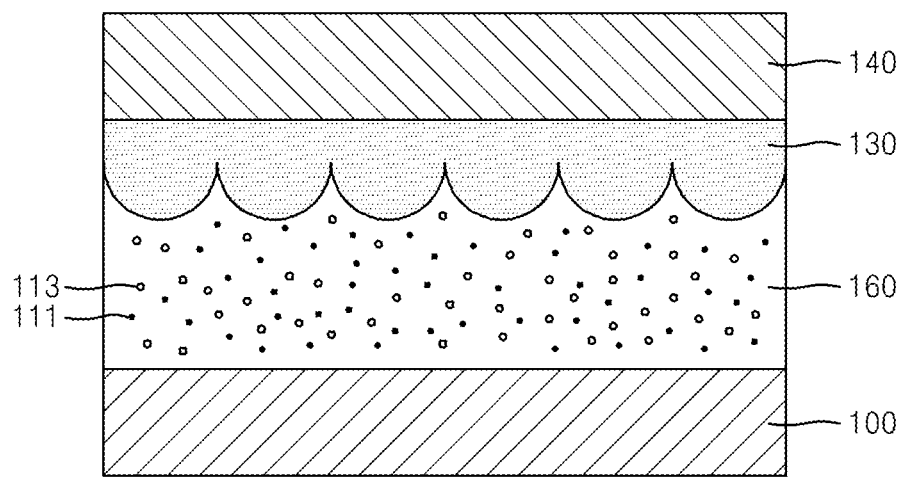
FIG. 6 is a cross-sectional view illustrating a color improving film according to another example embodiment.

Referring to FIG. 1, the high refractive light diffusion layer 110 including the light diffusers 111 and 113, and the low refractive light diffusion layer 120, may be formed separately, or alternatively, a high refractive light diffusion layer and a low refractive light diffusion layer may be integrated as a single unit as a layer 160 as illustrated in FIG. 6.

The low refractive resin layer 130 in which a lenticular lens pattern is formed includes a low refractive resin layer and a lenticular lens pattern formed on a surface of the low refractive resin layer. The lenticular lens pattern may be formed on a surface of the low refractive resin layer 130 facing the high refractive light diffusion layer 120.

The low refractive resin layer and the lenticular lens pattern may be formed of a single material as a single unit without using an adhesive. The lenticular lens pattern and the low refractive resin layer may include an ultraviolet hardening transparent resin having a refractive index of about 1.35 to about 1.45.

Figure 2:
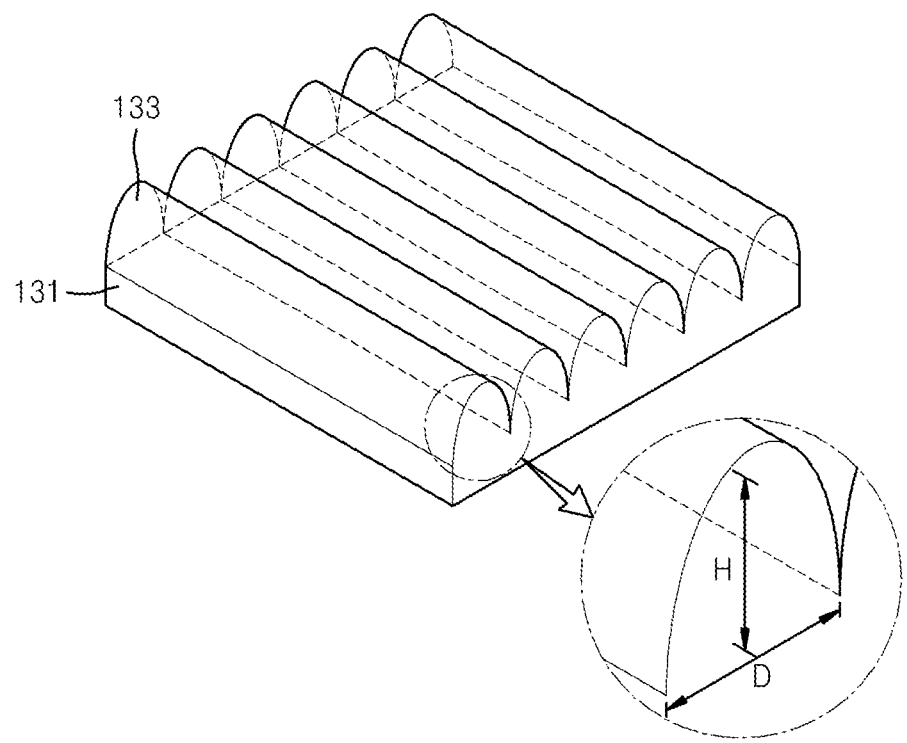
FIG. 2 is a perspective view illustrating a lenticular lens pattern according to an example embodiment.

FIG. 2 is a perspective view illustrating a lenticular lens pattern according to an example embodiment. Referring to FIG. 2, the lenticular lens pattern may be formed of a plurality of lenticular lenses 133 formed on a surface of a low refractive resin layer 131. The lenticular lenses 133 may have a width D of about 1 µm to about 1000 µm, a height H of about 1 µm to about 3000 µm, and an aspect ratio H/D of about 1.0 to about 3.0, for example, about 1.5 to about 2.5. A thickness of the low refractive resin layer 131 except an optical pattern may be about 5 µm to about 50 µm.

While it is typically advantageous to use a lenticular lens having a high aspect ratio in order to obtain a color improving effect, bite processing or rolling processing may be difficult, and an increase in manufacturing costs is likely due to a sharp decrease in the yield because of mass production. According to the example embodiment, good color improving effects may be obtained even by using a lenticular lens pattern having a relatively low aspect ratio, by introducing a high refractive light diffusion layer.

Figure 3:
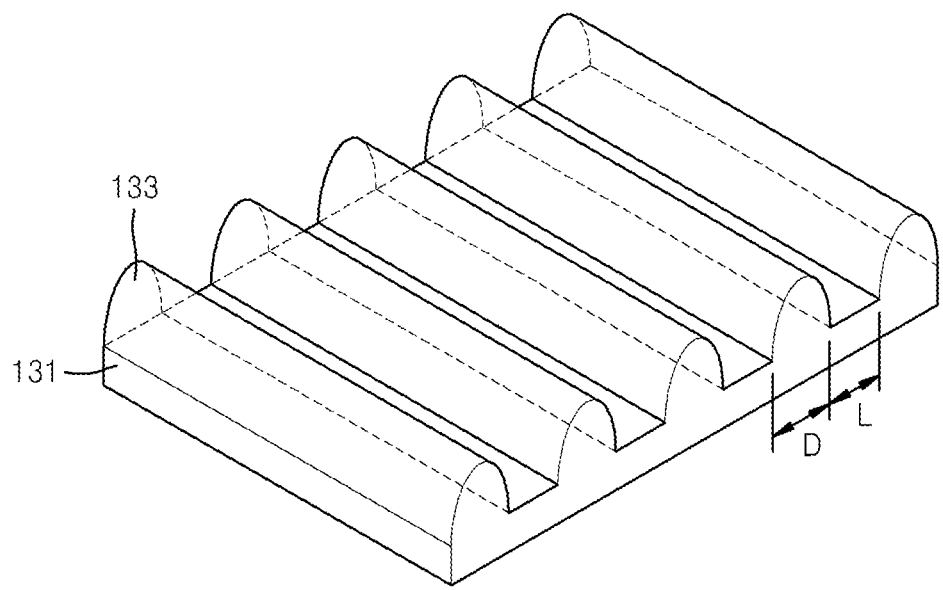
FIG. 3 is a perspective view illustrating a lenticular lens pattern according to another example embodiment.

FIG. 3 is a perspective view illustrating a lenticular lens pattern according to another example embodiment. Referring to FIG. 3, the lenticular lens pattern according to the example embodiment may include a plurality of lenticular lenses 133 that are arranged at predetermined distances L. A ratio between the distance L and a width of the lenticular lens 133 may be about 3.0 or less, for example, about 1.0 to about 2.0. An improvement effect in a color change according to an angle of view may be maximized in the above range.

Figure 4A:
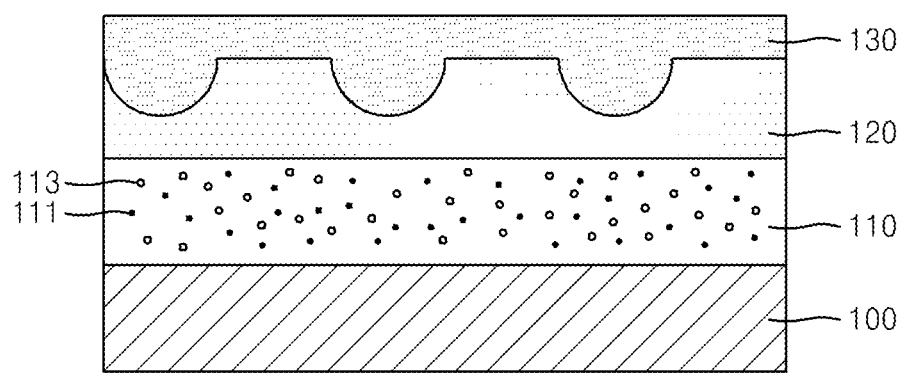
FIGS. 4A-4B are cross-sectional views illustrating a color improving film according to another example embodiment.
Figure 4B:
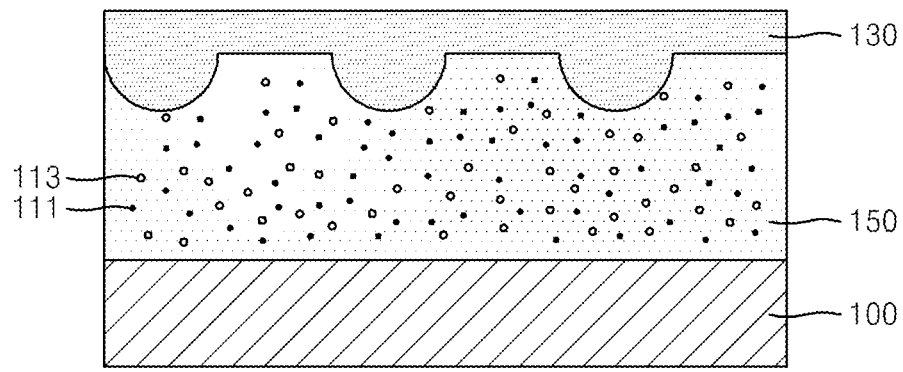

FIG. 4A is a cross-sectional view illustrating a color improving film including a lenticular lens pattern according to another example embodiment. FIG. 4B is a cross-sectional view illustrating a color improving film in which a high refractive light diffusion layer and a high refractive resin layer are formed as a single unit.

Referring to FIG. 4B, the color improving film in which a lenticular lens pattern is formed, according to an example embodiment may be a color improving film in which the high refractive light diffusion layer 110 and the high refractive resin layer 120 may be integrated as a single unit as a layer 150.

A basic resin used in the high refractive light diffusion layer 110, the high refractive resin layer 120, and the low refractive resin layer 130 in which a lenticular lens pattern is formed may include a ultraviolet hardening transparent resin as a transparent polymer resin.

The ultraviolet hardening transparent resin may be, for example, a resin having an acrylate-based functional group such as a polyesther resin, a polyether resin, an acrylic resin, an epoxy resin, a urethane resin, an alkyd resin, a spiroacetal resin, a polybutadiene resin, a polythiol polyene resin, and a (meta)acrylate resin of a multi-functional compound such as a polyhydric alcohol, which have a relatively small molecular weight.

Examples of the ultraviolet hardening transparent resin may include ethylene glycol diacrylate, neopentyl glycol di(meta)acrylate, 1,6-hexane diol(meta)acrylate, trimethylolpropane tri(meta)acrylate, dipenta erythritol hexa(meta)acrylate, polyol poly(meta)acrylate, di(meta)acrylate of bis phenol A-digylicidyl ether, poly esther (meta)acrylate which is obtainable by esterification of polyhydric alcohols, polybasic carboxylic acid and anhydrides thereof and acrylic acid, polysiloxane polycrylate, urethane(meta)acrylate, pentaerythritol tetrametacrylate, and glycerin trimethacrylate, but are not limited to.

Figure 5:
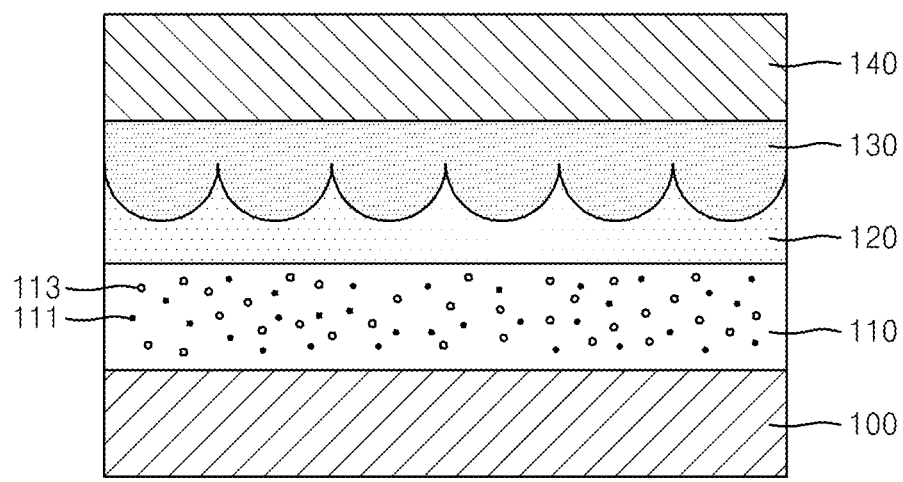
FIG. 5 is a cross-sectional view illustrating a color improving film according to another example embodiment.

According to another example embodiment, referring to FIG. 5, an adhesive layer 140 may further be stacked on the other surface of the low refractive resin layer 130. The adhesive layer 140 may be formed of a typical adhesive.

According to the color improving film having the above-described structure, a change in white angle dependency (WAD) according to an angle of view is relatively small. Accordingly, WAD according to an angle of view may be uniformly provided, and external light reflection may be improved while maintaining an equal luminance.

Method of Manufacturing Color Improving Film

A method of manufacturing a color improving film according to an example embodiment may include stacking, for example sequentially stacking, a base layer, a high refractive light diffusion layer, a high refractive resin layer, and a low refractive resin layer in which a lenticular lens pattern is formed. The method may include forming a high refractive light diffusion layer by spreading a resin including a diffuser on a surface of a base layer and hardening the resin, forming a high refractive resin layer comprising an engraved lenticular lens pattern, on a surface of the high refractive diffusion layer, and forming a low refractive resin layer having an optical pattern in a surface of the low refractive resin layer on a surface of the high refractive resin layer, in which a lenticular lens pattern is engraved, with a low refractive transparent resin, and hardening the low refractive resin layer.

According to another example embodiment, the method may further include forming an adhesive layer by covering the other surface of the low refractive resin layer with an adhesive.

The transparent resin may be formed of an ultraviolet hardening transparent resin. A high refractive transparent resin may have a refractive index of about 1.50 to about 1.60, and a low refractive transparent resin may have a refractive index of about 1.35 to about 1.45.

The high refractive light diffusion layer may be formed by sufficiently dispersing a light diffuser in a high refractive ultraviolet hardening transparent resin, and spreading the high refractive ultraviolet hardening transparent resin, in which the light diffuser is dispersed, on a surface of a base layer by using a planarization roller, and hardening the layer spread on the surface of the base layer. A thickness of the high refractive ultraviolet hardening transparent resin may be about 20 µm to about 30 µm. When the thickness exceeds 30 µm, an amount of the light diffuser may be too much so that a degree of light scattering may be high and thus light transmittivity may be decreased. When the thickness is less than 20 μm, a surface of the high refractive light diffusion layer may be rough due to a size of the light diffuser so that an adhesive force with respect to a film and a light diffusibility may not be provided sufficiently.

The high refractive resin layer may be formed by spreading a high refractive transparent resin on a surface of the high refractive light diffusion layer, and using a hard mold method using an engraving roller, in which an optical pattern is embossed, or a soft mold method using a film, in which an optical pattern is embossed. Also, the high refractive resin layer may be formed by using a hardening process such as ultraviolet ray radiation after forming an engraved optical pattern.

Hereinafter, a structure and a function of the color improving film according to example embodiments will be described in further detail. However, the embodiments are provided as examples and it should not be construed to limit the embodiments.

Description being sufficiently inferred by one of ordinary skill in the art will be omitted here.

Embodiment 1

After forming a color improving film in which respective layers described below are sequentially stacked, properties of the color improving film were evaluated and listed in Table 1 below.

A base layer: As the base layer, a TAC film that has a thickness of about 60 μm was used.

A high refractive light diffusion layer: The high refractive light diffusion layer was prepared using an ultraviolet hardening transparent acrylic resin including a light diffuser (available by Aekyung Chemicals, RS1400), and has a refractive index of about 1.52 and a thickness of about 30 μm. The light diffuser included about 1 wt % of non-coated silicon-based particles (available by Cheil Industries, Inc., SL-200, average particle diameter (D50) of about 2 μm)), and about 1 wt % of acrylic particles coated with black pigments (available by Sekisui, xx-2740Z, average particle diameter (D50) of about 10 μm) as an organic light diffuser.

A high refractive resin layer: The high refractive resin layer was formed of an ultraviolet transparent acrylic resin (available by Aekyung Chemicals, RS1400), and had a refractive index of about 1.52 and a maximum thickness of about 40 μm.

A low refractive resin layer including an optical pattern: The low refractive resin layer including an optical pattern was formed by continuously arranging a plurality of hemispheric lenticular lenses (distance L=0) on a surface of a low refractive resin layer formed using a ultraviolet hardening transparent acrylic resin (available by Shin-A T&C, SSC-3802) having a refractive index of about 1.39. The low refractive resin layer and the lenticular lenses were integrated as a single unit, the low refractive resin layer had a thickness of about 30 μm, and the lenticular lenses had a width D of about 10 μm, a height H of about 10 μm, and an aspect ratio H/D of about 1.0.

Embodiments 2-4 and Comparative Example 1 and 2

Figure 7:
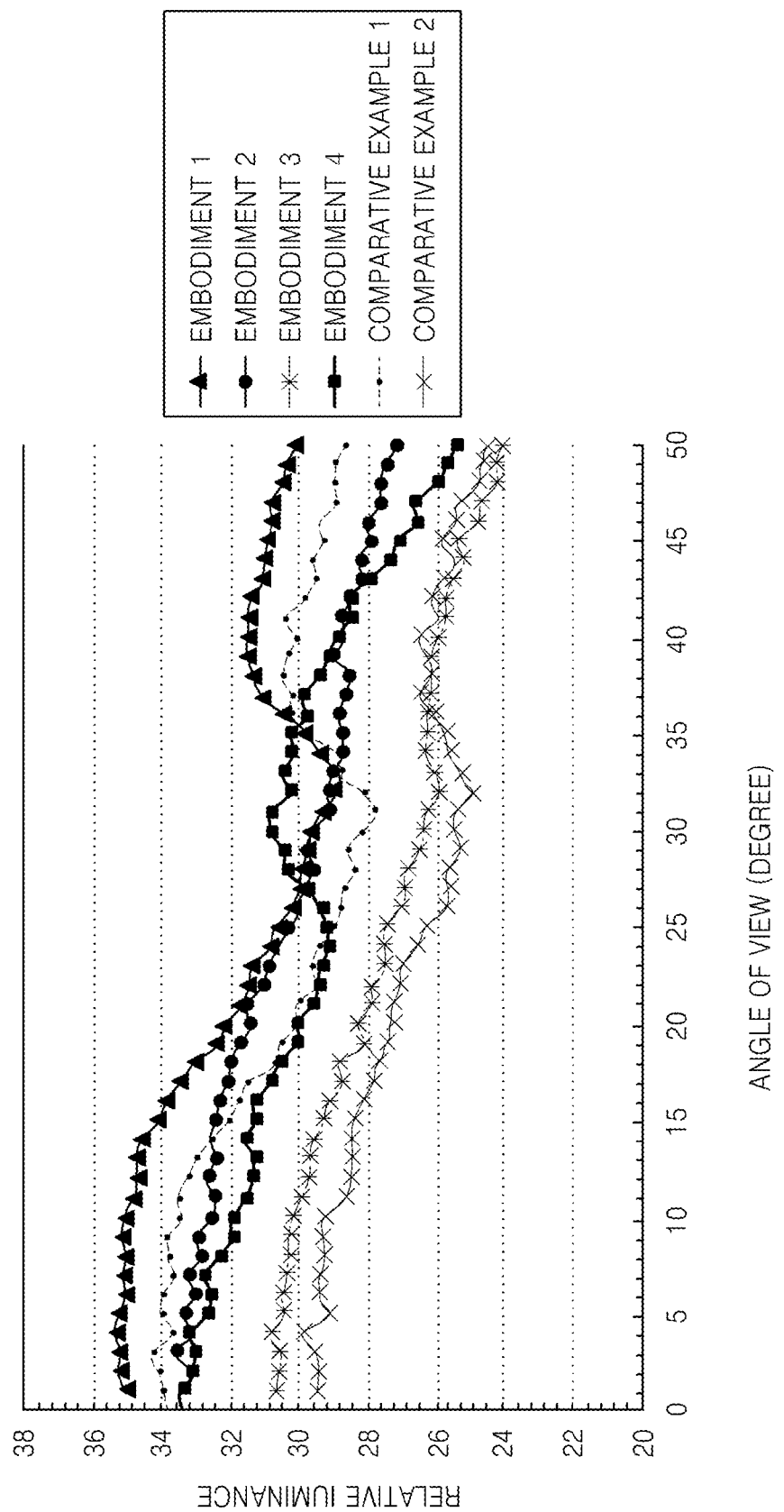
FIG. 7 is a graph showing luminance of a color improving film according to example embodiments and comparative examples according to an angle of view.
Figure 8:
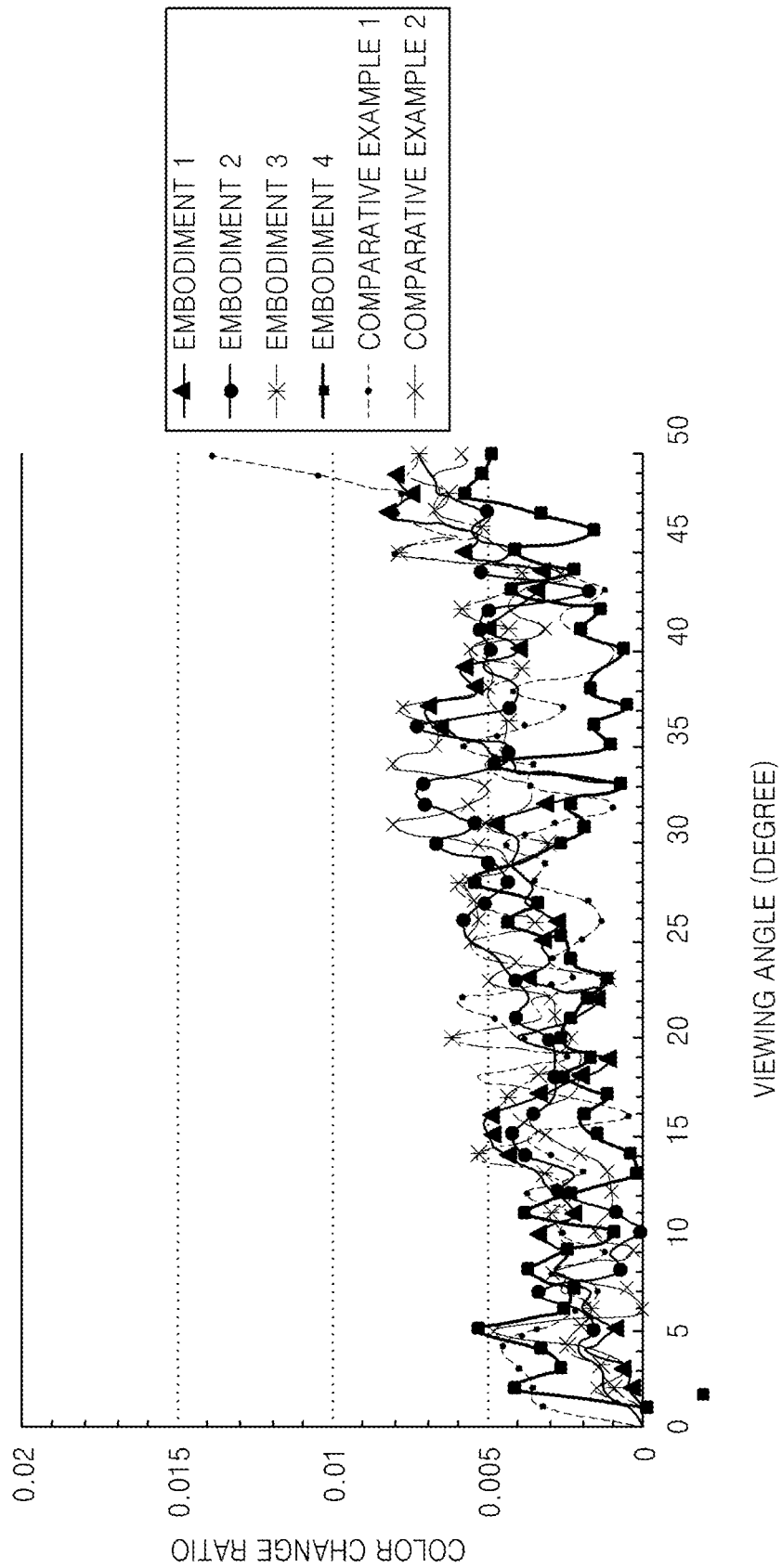
FIG. 8 is a graph showing a color change ratio of color improving films according to an angle of view measured in example embodiments and comparative examples.

A color improving film was formed in the same or a similar manner as in Example 1, except that respective layers of the color improving film were as shown in Table 1 below, and then properties of the color improving film were evaluated and also listed in Table 1. FIG. 7 is a graph showing the relative luminance of samples of the example Embodiments and of the Comparative Examples, attached on a panel in comparison with a panel having no attached film. FIG. 8 is a graph showing a color change ratio (ΔU'V') of samples of the example Embodiments and the Comparative Examples attached on a panel.

Method of Evaluating Properties

Light transmittivity (%) and light scattering (%): The manufactured color improving film was cut in a size of 5 cm×5 cm, and light is allowed to be incident on a surface of the low refractive resin layer exposed to the outside. Light transmittivity and light scattering of the film were measured using NDH5000W (available by Nippon Denshoku Industries, Co., Ltd) according to ASTM D1003.

Luminance and color change ratio (ΔU'V'): The films according to the example Embodiments and the Comparative Examples were cut in a size of 20 cm×20 cm, and were attached on an OLED TV panel, and a measurement device (EZcontrast, available by Eldim) was used to obtain color coordinates distribution values measured in all directions with respect to a center of the panel. Values from 0° to 50° were listed separately from among a measuring result to calculate a color change ratio ΔU'V' with respect to an angle of view of 0°. Also, luminance according to an angle of view and ΔU'V' values according to an angle of view are shown in FIGS. 7 and 8.

Reflectivity (%): The films according to the example Embodiments and the Comparative Examples were cut in a size of 20 cm×20 cm, and were attached on an OLED TV panel, and a measurement device EZcontrast (available by Eldim) was used to obtain luminance distribution values measured in all directions with respect to a center of the panel. Values from 0° to 65° were listed separately from among a measuring result to calculate a reflectivity by comparing with luminance of a measured angle with respect to a standard white reflection plate, and reflectivity values are listed in Table 1.

Luminance and a color change ratio were evaluated by attaching a circular polarization film on the color improving films of the example Embodiments and the Comparative Examples, to a display panel.

TABLE 1

|  |  | Embodiment 1 | Embodiment 2 | Embodiment 3 | Embodiment 4 | Comparative example 1 | Comparative example 2 |
| --- | --- | --- | --- | --- | --- | --- | --- |
| Refractive index | Light diffusion layer | 1.52 | 1.52 | 1.52 | 1.52 | 1.52 | 1.52 |
|  | High refractive resin layer | 1.52 | 1.52 | 1.52 | 1.52 | 1.52 | 1.52 |
|  | Low refractive resin layer | 1.39 | 1.39 | 1.39 | 1.39 | 1.39 | 1.39 |
| Organic | Black pigment | 1 | 1 | 5 | 1 | — | 5 |

TABLE 1-continued

|  |  | Embodiment 1 | Embodiment 2 | Embodiment 3 | Embodiment 4 | Comparative example 1 | Comparative example 2 |
|---|---|---|---|---|---|---|---|
| light diffuser (wt %) | coating particle |  |  |  |  |  |  |
|  | Non-coated particle | 1 | 5 | 5 | 1 | — | 1 |
| Lenticular lens | Aspect ratio (H/D) | 1.0 | 1.0 | 1.0 | 1.0 | 1.0 | 1.0 |
|  | Distance/width (L/D) | 0 | 0 | 0 | 1.0 | 0 | 0 |
| Light transmittivity (%) |  | 91.22 | 93.74 | 83.48 | 91.80 | 89.58 | 81.80 |
| Light scattering |  | 20.69 | 54.11 | 58.09 | 19.18 | 1.20 | 25.61 |
| Reflectivity (%) | 0° | 0 | 0 | 0 | 0 | 0 | 0 |
|  | 8° | 1.98 | 1.99 | 1.87 | 1.95 | 1.80 | 1.82 |
|  | 45° | 4.22 | 4.01 | 3.66 | 4.31 | 4.33 | 9.01 |
|  | 65° | 10.95 | 10.65 | 8.03 | 11.07 | 11.31 | 9.01 |
| ΔU'V' | 0° | 0 | 0 | 0 | 0 | 0 | 0 |
|  | 8° | 0.0025 | 0.0007 | 0.0028 | 0.0026 | 0.0026 | 0.0005 |
|  | 30° | 0.0048 | 0.0067 | 0.0052 | 0.0020 | 0.0045 | 0.0081 |
|  | 50° | 0.0108 | 0.0073 | 0.0114 | 0.0079 | 0.0139 | 0.0094 |

Referring to resultant values of Table 1 above, light transmittivity and light scattering of example Embodiments 1 through 4 are substantially improved compared to Comparative Example 1, in which polymer particles coated with a black pigment are not included, and compared to Comparative Example 2, in which an excess amount of polymer particles coated with a black pigment are included. Also, the fact that a low reflectivity and a low color change ratio (ΔU'V') were measured the greater an angle of view indicates that sufficient improvement in terms of external light reflection according to an angle of view and color improvement according to an angle of view were obtained.

It should be understood that the example embodiments described therein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope of the example embodiments as defined by the following claims.

What is claimed is:

1. A color improving film comprising:
   a base layer;
   a high refractive light diffusion layer including an organic light diffuser on the base layer;
   a high refractive resin layer on the high refractive light diffusion layer; and
   a low refractive resin layer in which a lenticular lens pattern is on the high refractive resin layer,
   wherein the organic light diffuser comprises particles, coated with a black pigment and non-coated particles, in a weight ratio of about 1:0.5 to about 1:5.0, and
   wherein the lenticular lens pattern is on a surface of the low refractive resin layer facing the high refractive resin layer.

2. The color improving film of claim 1, wherein the organic light diffuser comprises at least one of acrylic particles, siloxane based particles, melamine based particles, polycarbonate based particles, and styrene based particles.

3. The color improving film of claim 1, wherein the organic light diffuser comprises spherical particles having an average particle diameter (D50) of about 2 μm to about 20 μm, and the black pigment includes carbon black.

4. The color improving film of claim 1, wherein the organic light diffuser in the high refractive light diffusion layer is at a concentration of about 0.1 wt % to about 10 wt %.

5. The color improving film of claim 1, wherein the lenticular lens pattern is formed of a plurality of lenticular lenses, and one or more of the lenticular lenses have a width D of 1 μm to 1000 μm, a height H of 1 μm to 3000 μm, and an aspect ratio H/D of 1.0 to 3.0.

6. The color improving film of claim 1, wherein the lenticular lens pattern comprises a plurality of lenticular lenses,
   wherein two or more adjacent lenticular lenses are spaced apart by a distance L,
   wherein a ratio (L/D) between the distance L and a width D of one of the lenticular lenses is 3.0 or less.

7. The color improving film of claim 1, wherein the high refractive light diffusion layer and the high refractive resin layer include an ultraviolet hardening transparent resin having a refractive index of about 1.50 to about 1.60.

8. The color improving film of claim 1, wherein the low refractive resin layer comprises an ultraviolet hardening transparent resin having a refractive index of about 1.35 to about 1.45.

9. The color improving film of claim 1, wherein the lenticular lens pattern and the low refractive resin layer are formed as a single unit.

10. The color improving film of claim 1, wherein the high refractive light diffusion layer including the light diffuser and the high refractive resin layer are formed as a single unit.

11. The color improving film of claim 1, wherein the high refractive resin layer and the low refractive resin layer include one or more ultraviolet hardening resins having an acrylic functional group.

12. The color improving film of claim 1, wherein a thickness of the base layer is about 30 μm to about 200 μm, a thickness of the high refractive light diffusion layer is about 5 μm to 60 μm, a maximum thickness of the high refractive resin layer is about 5 μm to 80 μm, and a thickness of the low refractive resin layer is about 5 μm to 50 μm.

13. The color improving film of claim 1, further comprising an adhesive layer on another surface of the low refractive resin layer.

14. The color improving film of claim 1, wherein the base layer comprises triacetate cellulose (TAC), polyethylene terephthalate (PET), polycarbonate (PC), or poly vinyl chloride (PVC).

15. An organic light emitting display device comprising the color improving film of claim 1.

16. The color improving film of claim 1, wherein the lenticular lens pattern is periodic.

17. An organic light-emitting display including the color improving film of claim 1.

* * * * *